(12) United States Patent
Cushman

(10) Patent No.: US 8,178,014 B2
(45) Date of Patent: May 15, 2012

(54) METHODS OF FORMING AN ELONGATED ETHYLENIC FOAM STRUCTURE

(75) Inventor: Craig Cushman, Phoenix, AZ (US)

(73) Assignee: Bay Foam Products Inc., Green Bay, WI (US)

( * ) Notice: Subject to any disclaimer, the term of this patent is extended or adjusted under 35 U.S.C. 154(b) by 184 days.

(21) Appl. No.: 12/400,602

(22) Filed: Mar. 9, 2009

(65) Prior Publication Data

US 2009/0305029 A1  Dec. 10, 2009

Related U.S. Application Data

(60) Provisional application No. 61/035,222, filed on Mar. 10, 2008.

(51) Int. Cl.
*B29D 7/00* (2006.01)
*B29C 67/00* (2006.01)
*B29C 43/22* (2006.01)
*B29C 55/18* (2006.01)
*B32B 37/00* (2006.01)

(52) U.S. Cl. ............ 264/46.1; 264/45.5; 264/45.9; 264/46.3; 264/280; 425/363; 425/392

(58) Field of Classification Search .................... None
See application file for complete search history.

(56) References Cited

U.S. PATENT DOCUMENTS

| 5,277,515 A | 1/1994 | Hovis et al. |
| 5,859,076 A * | 1/1999 | Kozma et al. ........... 521/79 |
| 6,110,404 A * | 8/2000 | Ligon et al. ............ 264/50 |

* cited by examiner

*Primary Examiner* — Christina Johnson
*Assistant Examiner* — Benjamin Schiffman
(74) *Attorney, Agent, or Firm* — TraskBritt

(57) ABSTRACT

An extruded, low-density, ethylenic polymer foam including from about 86% by volume to about 98% by volume open cells and a continuous, impervious surface skin is disclosed. The foam possesses superior compression recovery and lower compression resistance when compared with similarly comprised ethylenic closed-cell foams and superior moisture resistance and handling characteristics when compared to open-cell foams. A precursor composition and method for making the extruded, low-density, ethylenic polymer foam are also disclosed.

19 Claims, 3 Drawing Sheets

METHODS OF FORMING AN ELONGATED ETHYLENIC FOAM STRUCTURE

PRIORITY CLAIM

This application claims the benefit of the filing date of U.S. Provisional Patent Application Ser. No. 61/035,222, filed Mar. 10, 2008, for "EXTRUDED, LOW DENSITY POLYETHYLENE FOAM."

FIELD OF THE INVENTION

The invention relates to extruded, low-density polyethylene foam that includes open cells in an amount in a range extending from about 86% by volume to about 98% by volume and to a unique method for producing same. The presence of open cells in the foam substantially reduces outgassing by enabling internal air-flow. The resulting product with an external impervious skin is especially useful in backer rods.

BACKGROUND

In the past, standard backer rods for sealant control have been developed from closed-cell polyethylene foam. These standard backer rods are extruded round rods of low-density, polyethylene (LDPE) material with a self-skinned outer covering. Prior to a sealant being applied, backer rods are inserted into joints between two cured masonry sidewalls. The backer rod may be compressively inserted into the joint and is installed at a depth, typically, of about one-half the width thereof.

After the backer rod is inserted in the expansion joint, the cavity remaining above the backer rod is filled with a sealant material. In practice, the cavity is slightly overfilled with the sealant and the excess is removed in an additional installation step. With the impact of usual ambient conditions over time, the closed cells and their outer skin may become ruptured, which results in trapped gasses escaping from the backer rod foam to the surface of the sealant. This phenomenon is often referred to in the art as "outgassing" and frequently disturbs the sealant.

Because the backer rod is generally impervious, the gasses are prevented from going any place other than through the overlying sealant material. Thus, outgassing may cause seepage through the sealant material leading to the formation of voids in the seal. Such voids compromise the integrity of the seal causing leakage, surface problems, and collapsed foam cells. The collapsed cells change the compression and recovery characteristics of the backer rod, which needs to be maintained during the expansion and contraction of the construction elements.

Bubbling at the surface of the sealant occurs when the seal of the backer rod materials in the expansion joint fails, especially as temperatures warm the joint. This may cause the structure being sealed to expand and compress the backer rod, squeezing the entrained air in a tear or puncturing the sealant.

To meet architectural standards and building code requirements, an installed standard backer rod needs to exhibit several specific physical properties, such as inertness, temperature resistance, low water absorption, and insulative qualities.

U.S. Pat. No. 5,277,515 to Hovis ("Hovis '515") discloses ethylenic polymer foam for a sealed building joint. The material is an extruded, low-density, non-outgassing ethylenic polymer foam containing 30% to 85% open cells and the remainder closed cells with a self-skinned exterior surface. The compression recovery and lower compression resistance of the foam is presented as being superior to similarly comprised ethylenic closed-cell foams. Additionally, the foam is presented as having superior moisture resistance and handling characteristics when compared to open-cell foams. Foams having greater than 50% open cells are generally extruded at temperatures of no less than 190° F. and no more than 420° F.

Accordingly, a material that provides qualities, such as inertness and compression- and temperature-resistance in a backer rod while substantially reducing problems such as outgassing is desired.

SUMMARY OF THE INVENTION

According to one embodiment, a method of forming a foam is provided. The method includes feeding a foamable polyethylene composition into an extruder, extruding the foamable polyethylene composition through the extruder at an elevated temperature to form an extruded foam rod or extruded foam ribbon having a certain open-cell content and an external, substantially continuous, impervious skin, thereafter compressing the extruded foam rod laterally before the foam is fully cured to increase the open-cell content thereof, then curing the foam to form an open-celled foam rod or ribbon having an integral surface skin covering the foam rod or ribbon. The unique compression step following extrusion of an open-cell/closed-cell foam structure is advantageous in increasing the open-cell content thereof to a predetermined open-cell content. Further, the compression step permits the production of an open-cell/closed-cell foam structure having characteristics unattainable by elevated temperature extrusion alone.

According to another embodiment, a precursor composition for forming an extruded foam composition includes an ethylenic polymer material selected from the group consisting of polyethylene, soft ethylenic copolymers, and blends thereof, and from about 2 wt % to about 20 wt % of at least one of ethylene vinyl acetate, GMS, and talc.

According to yet another embodiment, an extruded structure includes an ethylenic polymer material. The ethylenic polymer material includes from about 2 wt % to about 20 wt % of at least one of ethylene vinyl acetate, GMS, and talc. Thus, composition upon extrusion at an appropriate temperature and subsequent compression results in a foam structure having from about 86% by volume to about 98% by volume open cells and an external impervious skin. As a non-limiting example, the structure may be used to form a backer rod.

DETAILED DESCRIPTION OF THE INVENTION

Figure 1:
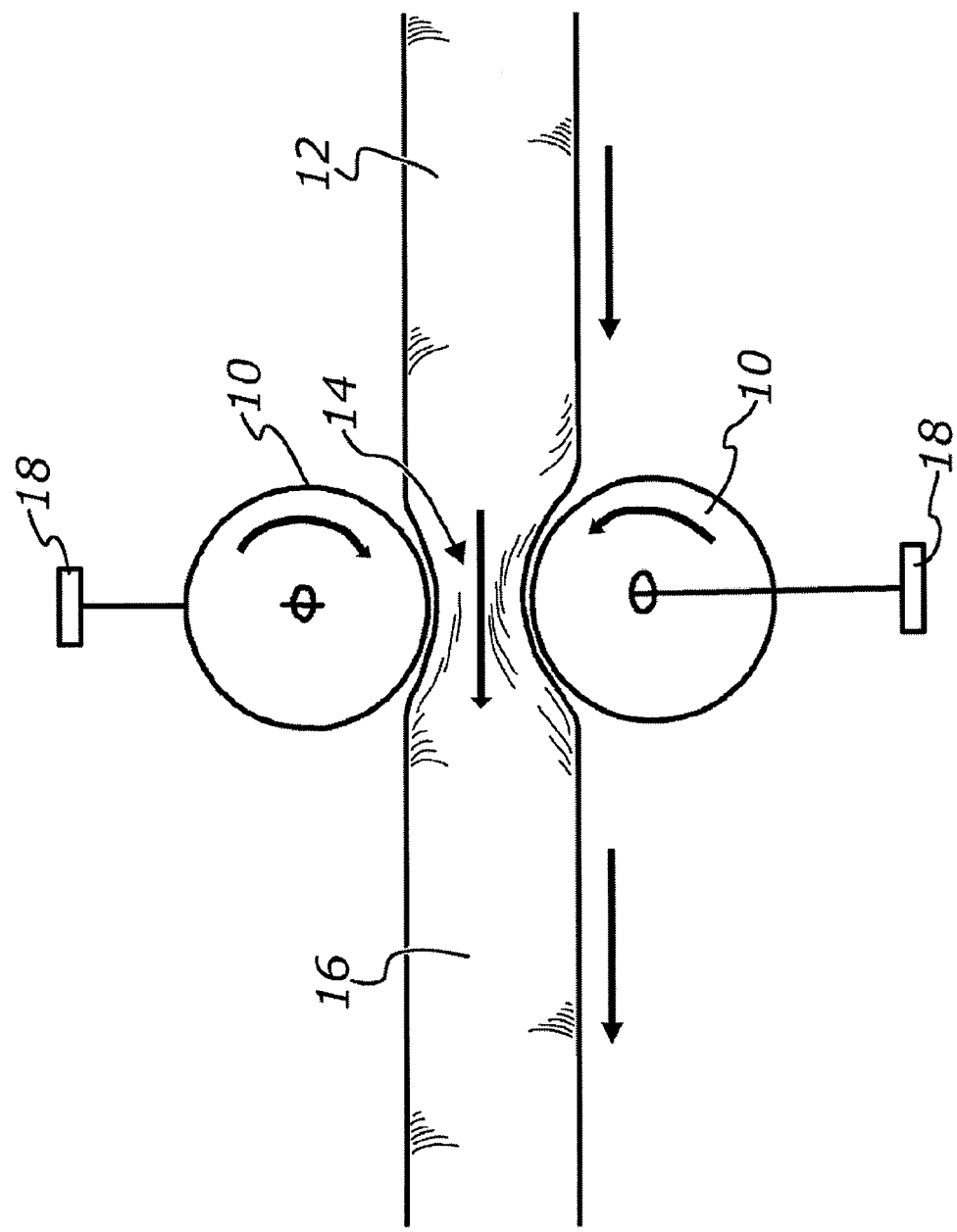
FIG. 1 is a schematic diagram illustrating an apparatus for processing an extruded, low-density foam according to the present invention.

An extruded, low-density foam having a substantially continuous, impervious surface skin that may be useful in forming a backer rod, and a precursor composition, and a method of forming such a foam are disclosed. Backer rods formed from the extruded, low-density foam may be employed, for example, in caulking and sealing applications, such as expansion joints in highways, bridges, buildings, and the like.

The foam may include a polymeric foam, such as polyethylene, soft ethylenic copolymers, or blends thereof, having a mixture of open cells and closed cells. For example, the polyethylene may be a low-density polyethylene (LDPE) and with a melt index (MI) of from about 1 to about 8.

A soft ethylenic copolymer is one that possesses a secant modulus of less than 15,000 psi, when measured by ASTM Method D-882. Such soft ethylenic copolymers include, but are not limited to, ethylene vinyl acetate (EVA), ethylene methyl acrylate (EMA), ethylene ethyl acrylate (EEA) and ethylene acrylic acid (EAA). Where high temperature resistance is required, a silane modified cross-linkable ethylene copolymer, such as a silane modified cross-linkable ethylene ethyl acrylate copolymer, and a catalyst for the cross-linkable copolymer are used. The blends may include from about 15 weight percent (wt %) to about 90 wt %, more specifically from about 25 wt % to about 75 wt % of at least one soft ethylenic copolymer. For example, the blend may include about 50 wt % of at least one soft ethylenic copolymer.

As a non-limiting example, the foam may include from about 86% by volume to about 98% by volume open cells. The open cells reduce the amount and probability of outgassing by allowing gasses to flow internally, rather than through the surface skin of the foam. Reduced outgassing facilitates a better seal by preventing gasses from penetrating the surface skin of the foam and creating voids in the sealant. Thus, the performance and effectiveness of the seal are substantially increased in by employing a backer rod including a foam having an open cell in an amount in a range of from about 86% by volume to about 98% by volume.

The foam may be prepared from a precursor that includes from about 75 wt % to about 90 wt % of a LDPE with a melt index of about 2.0 g/10 min., from about 2 wt % to about 20 wt % of EVA, from about 2 wt % to about 20 wt % of GMS and from about 2 wt % to about 20 wt % of talc. Additionally, a blowing agent, such as isobutene is used to perform the necessary foaming and contribute to the cell structure. During mixing, the precursor composition will begin to foam. Optionally, the precursor composition may include up to 3 wt %, more specifically, from about 0.05 wt % to about 3 wt %, of at least one additive. Examples of suitable additives include those typically used in polyolefin foam compositions including, but not limited to, colorants, such as pigments and dyes, ultraviolet (UV) aids, processing aids or flame retardants (FRs).

The blowing agents used are those typically used in the industry, such as, for example, isobutene, a hydrofluorocarbon, propane, n-butane, neopentane and hexane. The nucleating agents used are also those typically used in the industry, such as talc or calcium silicate. In some embodiments, the foam also contains a surface active agent to reduce static charges. The foam can also contain other conventional additives.

The precursor composition may be mixed using a mechanical blender capable of equalizing the components. The blender should be capable of evenly mixing all of the pelletized materials prior to extrusion.

To form the foam, the precursor composition may be extruded through using standard single screw foam extrusion machines. As a non-limiting example, foam extrusion equipment used for closed-cell foam extrusion, such as the single screw extruder system, which is commercially available, may be used to process the extruded, low-density foam. The extruders may include an air cooling ring to cool the surface of the foam immediately upon its emergence from a die.

The precursor composition may be extruded through the extruder system at a feed rate in a range from about 20 feet per minute (for 4-inch OD rods) to about 2000 feet per minute (for 0.25-inch OD rods) and at a temperature in a range of from about 190° F. (about 87.78° C.) to about 420° F. about (215.56° C.). As one of skill in the art will recognize, the temperature may be adjusted based on the desired properties of the foam, such as composition, diameter and open-cell content. Processing conditions during extrusion are controlled such that the resulting foam includes from about 40% by volume open cells to about 80% by volume open cells. Maintaining the proper temperatures is important in forming the desired ratio of open to closed cells and in obtaining an essentially integral surface skin.

The exact processing conditions will depend upon the size and configuration of the extruded product. The particular conditions for a particular product will be readily apparent to one skilled in the art, without undue experimentation, upon reading the specification.

After extrusion, the foam may have a density in a range of from about 1 lb/ft$^3$ to about 5 lb/ft$^3$, more specifically in a range of from about 1.5 lb/ft$^3$ to about 2.5 lb/ft$^3$.

Following extrusion and prior to curing of the foam, the foam may be processed using a compression means to increase the number of open cells while maintaining the integrity of the surface skin. As shown in FIG. 1, the foam 12 may be passed through rollers 10 that apply a desired pressure at a contact point 14. The rollers 10 may consist of any dimensions and composition needed to increase the open-cell content. For example, the rollers 10 may have a diameter in a range of from about 1 inch to about 10 inches, more specifically, about 5 inches. The diameter and length of the rollers 10 may be determined based on the diameter and configuration of the extruded foam to be processed using the rollers 10. The rollers 10 should be positioned such that they can pull the foam 12 from an extruder at a speed needed to produce the product 16 with a correct rod OD and at a compression necessary to open as many cells as possible. For example, the rollers 10 may be configured to produce the correct rod OD using supports 18. Compression should in a range of from about 5% of rod OD to about 70% of rod OD. The amount of pressure and number of passes through rollers 10 may be adjusted to affect cell size and quality of open-cell structures in the product 16. By passing the foam 12 through the rollers 10, the proper diameters are maintained and the amount of open cells may be increased to above about 86% by volume without disturbing the external skin of the foam 10 such that it is maintained in the product 16.

Figure 2:
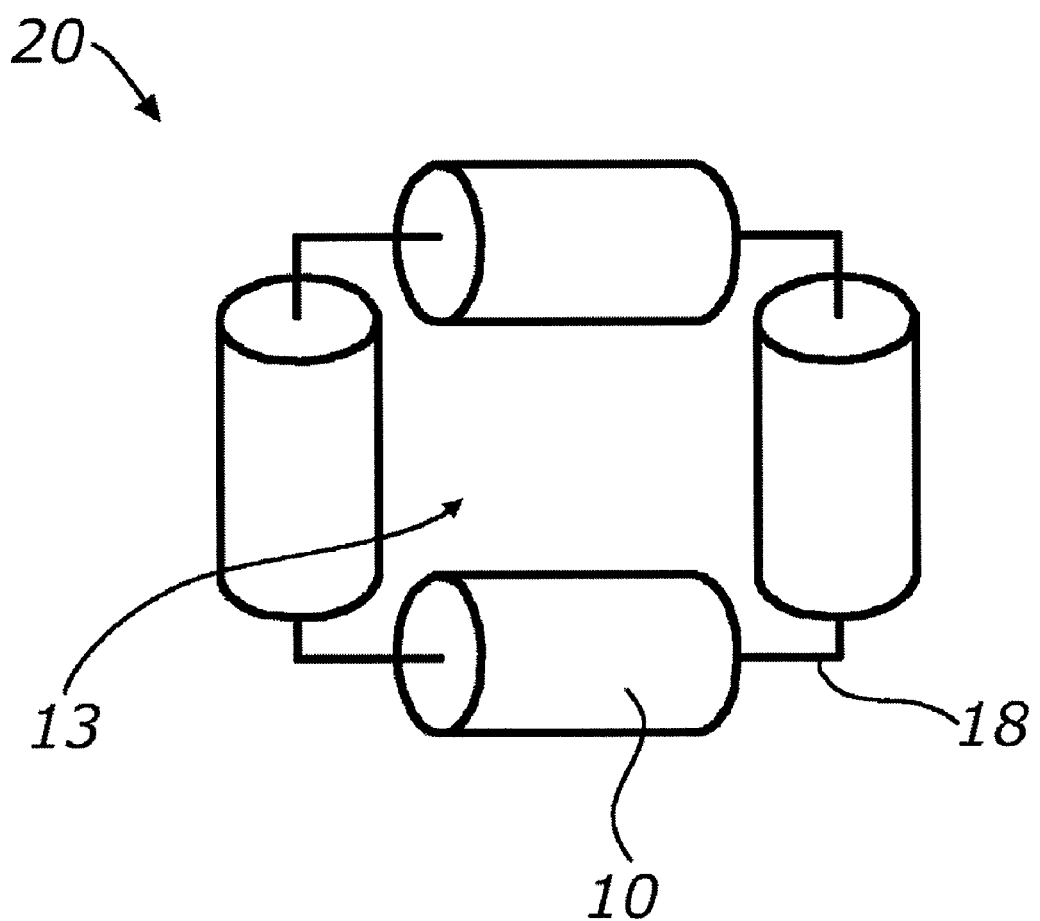
FIG. 2 is a schematic diagram illustrating a roller system that may be used to form an extruded, low-density foam according to the present invention.

Referring to FIG. 2, a roller system 20 is illustrated that may be used as a compression means to form the foamed product. The roller system 20 includes rollers 10 that are configured to encompass the extruded foam during compression and distribute pressure throughout the extruded foam. The roller system 20 may have a square configuration with the adjacent rollers 10 positioned at approximately a right angle with respect to one another and opposing rollers 10 configured to be perpendicular with respect to one another. Although the roller system 20 shown has an equilateral configuration, the rollers 10 may be positioned at any angle such that pressure applied by the rollers 10 is distributed across the surface skin of the extruded foam. The extruded foam may be passed through an opening 13 in the roller system 20 while a sufficient pressure to compress the foam is applied at each of the individual rollers 10. By compressing the extruded foam using the roller system 20, the structural characteristics may be altered to form a foam product with substantially no outgassing characteristic.

It is critical during the roller processing that the integral skin on the surface of the foam is not damaged, which would cause loss of integrity of the skin and outgassing of the foam. Thus, the pressure applied by the rollers 10 may be adjusted to prevent rupturing of or damage to the external, impervious skin. As a non-limiting example, the rollers 10 may be used to apply a pressure sufficient to compress the foam laterally dimensionally in a range of from about 5% to about 70% of the rod OD prior to completely curing.

Figure 3:
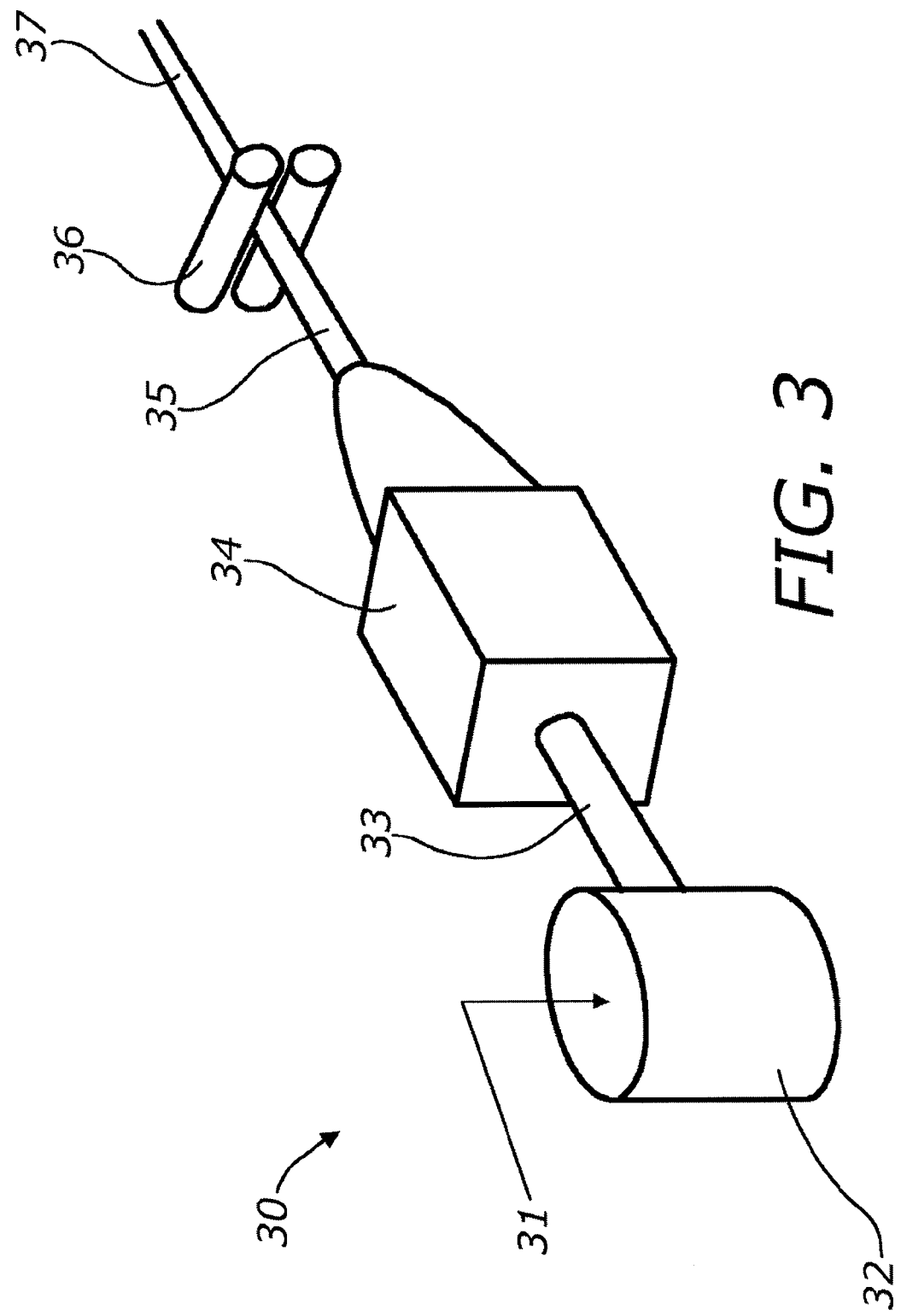
FIG. 3 is a schematic diagram illustrating a system that may be used to form to form an extruded, low-density foam according to the present invention.

FIG. 3 illustrates a system 30 that may be used to form an extruded foam rod having a certain open-cell content. A polymer feed material 31 may be supplied to and mixed to equalize the components therein using a mixer 32, such as a blender-type mixer. The polymer feed material 31 may include a foamable polyethylene composition that may be foamed upon mixing.

The foamed composition may be passed into an extruder 34 by way of an extruder feed conveyor 33. For example, the extruder feed conveyer 33 may be a conventional screw conveyor and may push the foamed composition into the extruder 34. Utilizing conventional extrusion techniques, the foamed composition may be continuously extruded to form a foam ribbon 35 that is radially encapsulated by a substantially impervious surface skin. The cross-sectional shape of the foam ribbon 35 is typically configured to be cylindrical, but may be configured in a variety of other shapes such as square, rectangular or hexagonal, dependent on the application of the final product. The extruder 34 may be a conventional screw-type extruder with interchangeable dies, the different sizes and shapes of which may be employed to produce various diameters of cylindrical ribbon or ribbons of various cross-sectional shapes.

Upon extrusion, the foam ribbon 35 may include from about 40% by volume to about 80% by volume open cells. The foam ribbon 35 may be fed through a compression means 36, such as the vertically adjustable rollers 10 described with respect to FIGS. 1 and 2. The compression means 36 may exert a sufficient pressure to affect cell size and quality of open-cell structures in the product without damaging or rupturing the external surface skin of the foam ribbon 35. Therefore, the exerted pressure may compress the extruded foam rod or ribbon laterally before the foam is fully cured. Accordingly, in embodiments in which the extruded foam rod or ribbon is cylindrical, the exerted pressure may be applied inwardly along radii of the extruded cylindrical foam rod or ribbon, and thereby compress the extruded cylindrical foam rod or ribbon radially before the foam is fully cured. After being fed through the compression means 36, the structural characteristics of the compressed foam ribbon 37 may be substantially altered. For example, the quantity of open cells in the compressed foam ribbon 37 may be substantially less than that of the uncompressed foam ribbon 35. The compressed foam ribbon 37 may include, for example, from about 80% by volume to about 98% by volume open cells.

The compression act subsequent to extrusion provides a finished product not obtainable simply by raising the extrusion temperature. The maximum open-cell content in the foam formed by extrusion at elevated temperatures is in the range of up to about 80% by volume. Aside from producing foam structures having a very high open-cell content, the compression step subsequent to extrusion produces a foamed product different in structure characteristics regardless of the open cell-content. Thus, the unique compression act produces a unique product.

The compression act may be used to increase the open-cell content of any heated, extruded polyethylenic foam and any other thermoplastic polymeric foam including, but not limited to, silicone, polyurethane, and modified silicone.

By processing the extruded foam by, for example, passing the foam through the rollers, the ratio of open cells to closed cells in the foam may be increased. After passing through the rollers, the foam may include about 86% by volume to about 98% by volume open cells. As a non-limiting example, the foam may consistently include about 90% by volume open cells, plus or minus about 2% by volume. Such a product is very useful as a lightweight backer rod having substantially no outgassing characteristic with excellent compressibility and resilience.

Compression of a hot, extruded ethylenic foam may be accomplished by means other than opposed rollers, so long as the integrity of an external, impervious skin is preserved. One such alternative compression means includes a pair of opposed, continuously moving belts having about the same linear speed (velocity) as the hot foam ribbon passing between the belts.

To preserve the integrity of the outer skin of the open-celled product, it is important during the compression step to minimize any friction at an interface between the exterior of the foam, namely the surface skin, and any compression means employed.

An advantage of the opposed rollers or opposed belts is that the extruded foam may be continuously compressed as it is exiting an extruder.

The foamed product can be compressed with static compression means by cutting the hot, extruded foam into desired lengths and immediately placing these hot structures between opposed platens to immediately apply a force thereto. A continuous compression system is, however, generally preferred.

The compression step following extrusion enables production of a foamed product that is essentially an open-celled product with an external, impervious skin that is unattainable by extrusion alone. The compression step further enables production of foamed products having a higher percent of open cells than is achievable by thermal extrusion. Elevated extrusion temperatures permit production of foams with up to about 80% by volume open cells, but increasing extrusion temperatures is generally detrimental to the foam quality.

The compression step, however, can be advantageously used with any extruded foam product to increase open-cell content. For example, the percent of the open cells for any extruded ethylenic polymeric foam by anywhere from 10% by volume to about 50% by volume leaves improvement. Also, the compression step is advantageous for extruding foams of any thickness (diameter).

The product formed according to the methods described herein can be structured to meet the general strength and resilient compressibility characteristics for backer rods including the outgassing standard set forth in ASTM C1253.

After processing, such as by passing the uncured or partially cured foam through rollers, the foam may have a density in a range of from about 1 lb/ft$^3$ to about 5 lb/ft$^3$, more specifically in a range of from about 1.5 lb/ft$^3$ to about 2.5 lb/ft$^3$.

The following example serves to explain embodiments of the present invention in more detail. This example is not to be construed as being exhaustive or exclusive as to the scope of this invention.

EXAMPLE

A polymer formulation identified as "Lite Rod" comprising open cells greater than 86%, was prepared by admixing all raw materials in any commercially available plastic extrusion mixer. That polymer formulation included with a blend comprising from about 75 wt % to about 90 wt % of a LDPE with a melt index (MI) of 2.0 g/10 min. (per ASTM D1238), about 2 wt % to about 20 wt % of EVA, GMS, and talc and, optionally, from about 0 wt % to about 3 wt % of at least one additive. The additives are typically present in a concentration of from about 0.05 wt % to about 3 wt % and can include those additives conventionally used in polyolefin foam compositions, including colorants, UV, FR aids, etc. The polymer formulation should be mixed in a mechanical blender that has the ability to equalize the mixtures before extrusion. The foam was then extruded through a single screw extruder that is commercially available from PE Tech operated at a temperature of about from about 190° F. to about 420° F. and a feed rate from about 20 feet per minute (for 4-inch OD rods) to about 2000 feet per minute (for 0.25-inch OD rods) to form a linear extrusion having a continuous external skin and an open-cell content greater than 86% by volume.

The extruded rods are then passed between a pair of rollers to effect a dimension at a compression of not less than 5% and not greater than 70% of the final rod OD. The temperature of the rod during the compression act is about 80° F. (about 26.67° C.). The rotational speed of the rollers is governed by the linear velocity of the foam ribbon passing therebetween since the rollers are free to rotate without significant rotational friction.

The strip exiting the rollers has an open-cell content of at least 86%, with the external skin being intact and impervious.

Polyethylenic foam backer rods with an open-cell/closed-cell content have become a preferred product for many sealing applications. Extrusion of such foams via the techniques disclosed in Hovis '515 produce such foams. However, even under the best conditions the foam structures so produced are not truly uniform in the integrity of the cell walls of the substantial quantity of closed cells in the structure, i.e., some individual closed cells have thicker or stronger cell walls than others. Closed cells with weaker cell walls are those which will rupture during the use of the foam product as backer rods and which then off-gas to the detriment of the sealing joint in which the product is used.

The backer rods produced by the instant invention, however, via the compression step subsequent to that extrusion, intentionally rupture the weaker, closed-cell walls to produce a foamed product, regardless of open-cell content, which has closed cells with more uniform cell wall strength and which will have less tendency to rupture and off-gas when compressed into a sealing joint, which will retain cell wall integrity.

Further, running an extruder at sufficiently high temperatures to obtain a foamed product with high open-cell content tends to produce foam, wherein the remaining closed-cell walls are weak and tend to fail in use, resulting in undesirable off-gassing. Thus, it is greatly preferred to produce an open-cell/closed-cell-formed product for use as backer rods by running the extruder at temperatures consistent with producing foams having a significant percent of the closed cells with good cell wall strength and then increasing the open-cell content via a compression step to rupture intentionally those closed cells having weak cell wall integrity. Thus, foams produced by the instant invention regardless of open-cell content, e.g., from about 50% by volume to about 98% by volume, have a better uniformity of closed-cell wall strength and have generally less off-gassing characteristics than foam produced solely by thermal extrusion.

Further, it has been found that the rebound characteristics of foams produced by the instant invention cure better than foams of an equivalent open-cell content produced solely by thermal extrusion.

A further difficulty of rising very elevated extrusion temperatures to attain a high content of open cells is an adverse effect upon the integrity of the skin covering the external surface of the extruded product. At such very elevated temperatures, the surface skin is soft and ruptures through the skin tend to occur, thus producing an inferior product.

A better technique is to run an extruder at temperatures consistent with the production of a strong, continuous impervious skin and then attaining the desired open-cell content by the subsequent compression step of the instant invention.

A further advantage is that the extruder may be run at a higher throughput when a subsequent compression step is used to produce a foamed product with a certain open-cell content.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of forming an elongated ethylenic foam structure, the method comprising:
   feeding a foamable polyethylene composition into an extruder;
   extruding the foamable polyethylene composition through the extruder at an elevated temperature to form an extruded foam rod or ribbon having a certain open-cell content and an external, substantially continuous, impervious skin;
   passing the extruded foam rod or ribbon through a roller system to compress the extruded foam rod or ribbon laterally before curing of the foam to increase the open-cell content thereof. the roller system comprising two pairs of opposing rollers, one of the two pairs of opposing rollers being perpendicularly disposed to another of the two pairs of opposing rollers; and
   curing the foam to form an open-cell foam rod or ribbon having an integral surface skin covering the open-cell foam rod or ribbon.

2. The method of claim 1, wherein feeding the foamable polyethylene composition into the extruder comprises feeding a composition comprising an ethylenic polymer material selected from the group consisting of polyethylene, soft ethylenic copolymers and blends thereof through the extruder.

3. The method of claim 2, wherein feeding the foamable polyethylene composition into the extruder comprises feeding a composition that further comprises at least one additive selected from the group consisting of EVA, GMS, talc, isobutene, a colorant, an ultraviolet aid, and a fire retardant.

4. The method of claim 1, wherein extruding the foamable polyethylene composition through the extruder at an elevated temperature comprises extruding the foamable polyethylene composition at a temperature in the range of from about 190 degrees Fahrenheit to about 20 degrees Fahrenheit to form the extruded foam rod or ribbon.

5. The method of claim 1, wherein extruding the foamable polyethylene composition through the extruder at an elevated temperature comprises extruding the foamable polyethylene composition through the extruder at the elevated temperature to form an extruded foam rod having a certain open-cell content; an external, substantially continuous impervious skin; an OD from about 0.25 inch to about 5 inches; and a density of from about 1.5 lb/ft$^3$ to about 2.5 lb/ft$^3$.

6. The method of claim 1, further comprising mixing the precursor composition at a temperature in a range of from about 190 degrees Fahrenheit to about 20 degrees Fahrenheit.

7. The method of claim 1, further comprising mixing the precursor composition to form an equalized composition.

8. The method of claim 1, wherein passing the extruded foam rod or ribbon through a roller system to compress the extruded foam rod or ribbon laterally comprises passing the extruded foam rod or ribbon through the roller system to laterally encompass the extruded foam rod or ribbon with sufficient pressure to form additional open cells without disturbing the integral surface skin.

9. The method of claim 1, wherein passing the extruded foam rod or ribbon through a roller system to compress the extruded foam rod or ribbon laterally comprises passing the extruded foam rod or ribbon through the roller system to laterally compress the extruded foam rod or ribbon through the two pairs of opposing rollers at a velocity of about 20 feet per minute to about 2000 feet per minute to form a linear extrusion having a continuous external skin and an open-cell content greater than 86%.

10. The method of claim 1, wherein passing the extruded foam rod or ribbon through a roller system to compress the extruded foam rod or ribbon laterally comprises passing the extruded foam rod or ribbon through the roller system to compress the extruded foam rod or ribbon radially inwardly along radii of the extruded foam rod or ribbon to form a rod or ribbon having an amount of open cells greater than about 86% by volume.

11. The method of claim 1, wherein curing the foam comprises curing the foam to form an open-cell foam rod or ribbon having an integral surface skin covering the open-cell foam rod or ribbon and having outgassing properties defined by the standard set forth in ASTM C1253.

12. A method of forming an elongated ethylenic foam structure, the method comprising:
  feeding a foamable polyethylene composition into an extruder;
  extruding the foamable polyethylene composition through the extruder at an elevated temperature to form an extruded foam rod or ribbon having a certain open-cell content and an external, substantially continuous, impervious skin;
  before curing the foam, passing the extruded foam rod or ribbon through a roller system comprising two pairs of opposing rollers, one of the two pairs of opposing rollers being perpendicularly disposed to another of the two pairs of opposing rollers, the roller system configured to apply a compressive force to the extruded foam rod or ribbon without disturbing the external, substantially continuous, impervious skin to increase the open-cell content of the extruded foam rod or ribbon; and
  curing the foam to form an open-cell foam rod or ribbon having an integral surface skin covering the foam rod or ribbon.

13. The method of claim 12, wherein passing the extruded foam rod or ribbon through a roller system comprises passing the extruded foam rod or ribbon through the roller system immediately following extruding the foamable polyethylene composition through the extruder.

14. The method of claim 12, wherein passing the extruded foam rod or ribbon through a roller system comprising two pairs of opposing rollers comprises passing the extruded foam rod or ribbon through a roller system comprising two pairs of opposing rollers defining a single compression point.

15. The method of claim 12, wherein passing the extruded foam rod or ribbon through a roller system comprising two pairs of opposing rollers comprises passing the extruded foam rod or ribbon through a roller system comprising two pairs of opposing rollers, each roller of the two pairs of opposing rollers configured to rotate about an axis without significant rotational friction and to apply the compressive force to the extruded foam rod or ribbon without disturbing the external, substantially continuous, impervious skin.

16. The method of claim 12, wherein passing the extruded foam rod or ribbon through a roller system comprising two pairs of opposing rollers comprises passing the extruded foam rod or ribbon through the roller system at a predetermined linear velocity, the roller system comprising the two pairs of opposing rollers, each roller free to rotate about an axis at a rotational speed governed by the predetermined linear velocity.

17. A method of forming an elongated ethylenic foam structure, the method comprising:
  extruding a foamable polyethylene composition through an extruder at an elevated temperature to form an extruded elongate foam structure having a certain open-cell content and an external, substantially continuous, impervious skin;
  passing the extruded elongate foam structure through a roller system to compress the extruded elongate foam structure, without first curing the extruded elongate foam structure, to increase the open-cell content thereof and without disturbing the external, substantially continuous, impervious skin, the roller system comprising two pairs of opposing rollers, one of the two pairs of opposing rollers being perpendicularly disposed to another of the two pairs of opposing rollers.

18. The method of claim 17, wherein passing the extruded elongate foam structure through a roller system comprises passing the extruded elongate foam structure through the roller system, the roller system comprising more than two pairs of opposing rollers applying a compressive pressure inwardly against the external, substantially continuous, impervious skin.

19. The method of claim 18, wherein passing the extruded elongate foam structure through the roller system comprises passing the extruded elongate foam structure through the roller system comprising more than two pairs of opposing rollers defining a single compression point, the more than two pairs of opposing rollers applying compressive pressure inwardly against the external, substantially continuous, impervious skin at the single compression point.

* * * * *

UNITED STATES PATENT AND TRADEMARK OFFICE
CERTIFICATE OF CORRECTION

PATENT NO.        : 8,178,014 B2                                    Page 1 of 1
APPLICATION NO.   : 12/400602
DATED             : May 15, 2012
INVENTOR(S)       : Craig Cushman It is certified that error appears in the above-identified patent and that said Letters Patent is hereby corrected as shown below:

In the claims:
CLAIM 4,    COLUMN 8,    LINE 62,    change "20 degrees" to --420 degrees--
CLAIM 6,    COLUMN 9,    LINE 7,     change "20 degrees" to --420 degrees--

Signed and Sealed this
Twenty-fourth Day of December, 2013

Margaret A. Focarino
*Commissioner for Patents of the United States Patent and Trademark Office*